G. B. N. DOW AND F. COLE.
HOOK.
APPLICATION FILED JUNE 6, 1919.

1,325,627.

Patented Dec. 23, 1919.

George B. N. Dow
Frank Cole Inventors

Witness

UNITED STATES PATENT OFFICE.

GEORGE B. N. DOW AND FRANK COLE, OF MANCHESTER, NEW HAMPSHIRE.

HOOK.

1,325,627.  Specification of Letters Patent.  Patented Dec. 23, 1919.

Application filed June 6, 1919. Serial No. 302,239.

*To all whom it may concern:*

Be it known that we, GEORGE B. N. DOW and FRANK COLE, citizens of the United States, residing at Manchester, in the county of Hillsboro, State of New Hampshire, have invented a new and useful Hook, of which the following is a specification.

This invention relates to hooks for connecting the ends of chains or the like and is intended more particularly for use in connecting the ends of anti-skid chains for use on motor vehicle wheels and has for its object the provision of a simple device in which no springs are used to maintain the keeper in position on the hook and in which it is impossible for the device to become loose until manually operated to remove the keeper from the hook.

It is further within the province of the disclosure to improve generally and to enhance the utility of devices of this class to which the present invention appertains.

Although the preferred construction of the invention is shown it is to be understood that changes may be made in the same within the scope of the claims without departing from the spirit or sacrificing any of the advantages of the invention.

In the drawing:—

Figure 1:
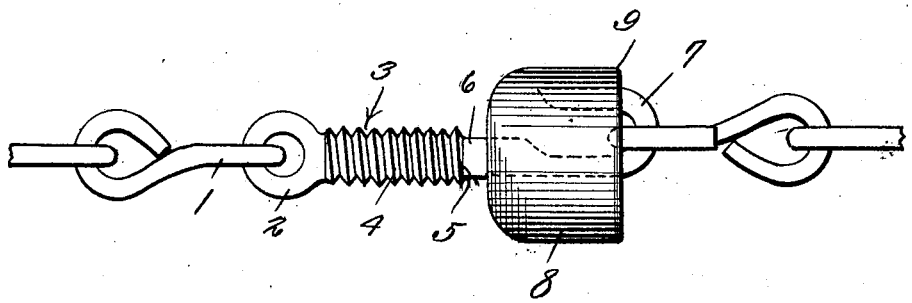
Figure 1 is a view in side elevation of the invention.
Figure 2:
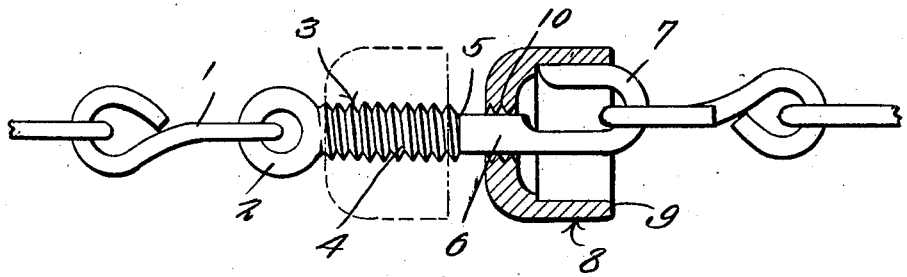
Fig. 2 is a longitudinal sectional view with parts in elevation.

Referring to the drawing by characters of reference in which like characters designate like parts throughout the drawing, there is shown a chain, the last link 1 of which is passed through an eye 2 formed on the end of a rod 3. The rod is screw-threaded for a portion of the length as shown at 4, the threaded portion terminating to form a shoulder at 5. A reduced stem 6 extends from the shoulder 5 and has formed on the end thereof a hook 7 adapted to engage a link of the chain as shown.

Mounted on the rod 3 is a cup shaped housing 8 having a flange 9 and a screw-threaded opening 10, said opening being adapted to engage the thread on the portion 4 of the rod.

When the cup 8 is moved to the reduced portion as shown the flange 9 houses the open end of the hook 7 and prevents the chain from coming off the hook. The shoulder 5 serves as an abutment to prevent the member 8 moving away from the hook.

To remove the chain from the hook it is necessary to manually operate the member 8 to screw the same along the threaded portion 4 of the rod 3 far enough to permit removal of the chain.

The security with which the ends of a chain may be removably connected together by this device makes it practically adapted for use in fastening anti-skid chains on automobile wheels, although it is equally useful in connecting any kind of flexible elements.

Figure 3:
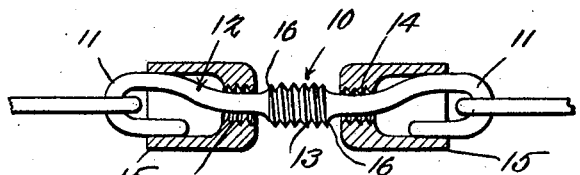
Fig. 3 is a view in elevation with parts in section of a modification.

In Fig. 3 is shown a device 10 having hooks 11 at both ends of a rod 12 the same being screw threaded at 13 for receiving the threaded portion 14 of either of two caps 15 which are adapted to house and thus close the open end of its respective hook 11. A shoulder 16 formed by the termination of the threaded portion, serves as an abutment to prevent the housing from moving off the hook.

Having thus described the invention what is claimed is:—

1. In a device of the class described a shank and a hook the shank having an enlargement; and a closure for the hook, the closure being slidable on the shank and being held in closed position with respect to the hook by the enlargement, the closure and the enlargement having threaded parts coöperating to effect a retraction of the closure.

2. In a device of the class described, a rod provided at one end with a hook, and having a reduced portion adjacent the hook, a further extended screw threaded portion; and a cup shaped housing loosely engaging the reduced portion to close the hook and adapted to engage the screw threaded portion to retract the housing from the hook.

In testimony that we claim the foregoing as our own, we have hereto affixed our signatures in the presence of two witnesses.

GEORGE B. N. DOW.
FRANK COLE.

Witnesses:
CHAS. F. COLE,
OLIVE H. COLE.